United States Patent [19]

Baebel

[11] Patent Number: 5,747,104
[45] Date of Patent: May 5, 1998

[54] METHOD TO CONTROL FUGITIVE DUST AND SODIUM HYDROXIDE IN BAUXITE TAILINGS DISPOSAL PITS

[76] Inventor: Ronald G. Baebel, 9107 White Oak La., Houston, Tex. 77040

[21] Appl. No.: 794,415

[22] Filed: Feb. 5, 1997

[51] Int. Cl.$^6$ .................................................. B05C 5/12
[52] U.S. Cl. ..................... 427/136; 427/154; 427/180; 427/201
[58] Field of Search ................................ 427/136, 201, 427/180, 154

[56] References Cited

U.S. PATENT DOCUMENTS 4,594,268  6/1986  Kirwin ........................... 427/136

*Primary Examiner*—Janyce Bell
*Attorney, Agent, or Firm*—James H. Riley, II

[57] ABSTRACT

A method for controlling both fugitive bauxite dust and sodium hydroxide contamination generated by the waste disposal of bauxite tailings from aluminum processing plants comprising using magnesium chloride or sodium chloride or mixtures thereof on the surface of the disposal pits, which are also known as mud lakes. Preferably, a solution of magnesium chloride is applied to the surface of a dry or partially dry mud lake. The magnesium chloride neutralizes the sodium hydroxide on the surface, forms a hard crust that covers the fine bauxite particles and also inhibits the migration of unreacted sodium hydroxide to the surface.

16 Claims, No Drawings

METHOD TO CONTROL FUGITIVE DUST AND SODIUM HYDROXIDE IN BAUXITE TAILINGS DISPOSAL PITS

BACKGROUND OF THE INVENTION

This invention relates to the control of both fugitive dust and sodium hydroxide from bauxite tailings storage areas at aluminum processing plants. Aluminum processors commonly use the Bayer process to recover metallic aluminum from bauxite ores. The waste product from this process is called bauxite tailings, and it is usually sent to storage areas which are known as "mud lakes."

Typically, mud lakes comprise a series of open pits into which a slurry of bauxite tailings is pumped. This slurry of bauxite tailings generally has about a 40% solids content. Once the first pit is filled to a certain level, the slurry is directed to another pit, and the first pit is allowed to dry by evaporation. This process continues until the other pits are filled, at which time the first pit should be sufficiently dry to permit refilling with more bauxite slurry. The disposal process continues in sequence to the other dried pits.

There are two main problems that arise with this commonly used disposal process. First, when a mud lake dries, the surface of the lake becomes very powdery because the bauxite tailings have a fine particle size, usually measured in the micron range. Even a slight breeze will cause the particles to become airborne creating an environmental hazard. In fact, the EPA has established a current limit on the opacity of fugitive dust at 30%, and this limit is frequently exceeded resulting in large fines being assessed against some aluminum producing plants.

The second problem involves the chemical makeup of the bauxite slurry. In the aluminum recovery process, the pH of the bauxite solution is raised to about 14 with the use of sodium hydroxide. Consequently, the slurry of bauxite tailings also contains a high pH because of the sodium hydroxide that remains in solution.

As the mud lake dries, the sodium hydroxide on the surface and the subsurface sodium hydroxide which migrates to the surface eventually covers the surface with a fine sodium hydroxide powder which is also easily airborne. The winds carry this highly corrosive powder onto neighboring property where it causes severe damage to houses and cars. Ultimately, the aluminum producer is responsible for the damage done to the property of others. This expense, in addition to the fines levied by the EPA, has prompted the industry to seek a solution to this worldwide problem. In fact, each year a worldwide aluminum producers conference discusses progress made on solving these problems.

Several methods have been devised to solve the fugitive dust and sodium hydroxide problems. Some examples of chemical methods include latex polymers, guargums, ligon solutions, asphalt emulsions, acids and surfactants. Each of these "solutions" has been ineffective in solving the stated problems. Asphalt emulsions have been used to control dust, but they last only a short time and are simply washed away if it rains. Acids are used to control the sodium hydroxide problem, but they are spent near the surface. As the sodium hydroxide continues to migrate to the top of the mud lake, the acid must be reapplied to neutralize the sodium hydroxide.

An example of a physical method is the use of a water spray system to keep the surface damp. This method is expensive, and it obviously slows the evaporating process which is essential to continued operation of the plant. It is evident that this disposal problem continues to plague the aluminum producers industry, and with further tightening of the EPA regulations, it is imperative that an economical and effective solution be found.

BRIEF SUMMARY OF THE INVENTION

It has been discovered that magnesium chloride or calcium chloride or a mixture thereof is effective in controlling fugitive dust and in neutralizing sodium hydroxide. Magnesium chloride is the preferred embodiment, and it is preferably applied by spraying it onto the dried or partially dried surface of a mud lake in two separate applications. In the first application, a solution of magnesium chloride reacts with the sodium hydroxide to form magnesium hydroxide and sodium chloride. The heat from the formation of the magnesium hydroxide and sodium chloride also converts unreacted magnesium chloride to magnesium oxide and hydrochloric acid.

In the second application, the magnesium chloride and magnesium oxide further react to form Sorel cement. This cement forms a hard crust on the surface which inhibits the formation of fugitive dust. As an added benefit, the unreacted dry magnesium chloride on the surface is hygroscopic and absorbs water from the air so it actually forms a barrier to the further migration of sodium hydroxide to the surface.

DETAILED DESCRIPTION OF THE INVENTION

This invention is an efficient and effective method to control the fugitive dust and sodium hydroxide problems associated with the mud lake disposal pits in aluminum processing plants. In the manufacture of aluminum, the waste materials, which consist mainly of a slurry of bauxite tailings, are sent to mud lakes for disposal. These bauxite tailings comprise a basis solution having a pH of about 14 because of the sodium hydroxide that was used to extract the aluminum from the bauxite ore. As the slurry dries in the mud lake, the surface becomes dusty from the fine bauxite particles and corrosive from the sodium hydroxide that has migrated to the surface. This bauxite dust and sodium hydroxide powder are easily airborne and cause severe pollution problems and damage to surrounding property.

It has been discovered that magnesium chloride or calcium chloride or a mixture of these compounds dramatically reduces fugitive bauxite dust and sodium hydroxide contamination from mud lakes. Magnesium chloride is the preferred compound for this invention for several reasons. First, it appears to be more effective in reducing fugitive dust because it forms a hard cement-like layer on the surface of the dried mud lake. Second, it is more cost efficient in today's market. Third, it is readily available as a waste brine solution produced during oil and gas recovery.

With respect to the third advantage, the oil and gas industry frequently encounters brine solutions during recovery operations. Such brine solutions are connate waters which are produced along with oil or gas and are separated in the hydrocarbon recovery process. In some formations, the primary salt in this brine solution is magnesium chloride. An especially preferred brine solution for use in this invention is about 30 wt % magnesium chloride and about 5 wt % calcium chloride and has a bulk density of about 10.85 pounds per gallon.

With respect to the second advantage, magnesium chloride solution is about half as costly in today's market as calcium chloride solution. For example, 31% by weight magnesium chloride solution costs about $30 per wet ton while 38% by weight calcium chloride solution costs about $60 per wet ton. It takes 1.19 pounds of magnesium chloride to neutralize one pound of sodium hydroxide. Therefore, it takes 3.84 pounds of wet magnesium chloride to neutralize one pound of sodium chloride at a materials cost of $0.08. By comparison, it takes 1.38 pounds of calcium chloride to neutralize one pound of sodium hydroxide. At the concentration specified, it would take 3.63 pounds of wet calcium chloride to neutralize one pound of sodium hydroxide at a materials cost of $0.15. Therefore, it is evident that using magnesium chloride is more cost effective in today's marketplace.

Perhaps the most important advantage in using magnesium chloride is the formation of Sorel cement on the surface of the mud lake. This cement actually forms a hard crust that prevents the fugitive dust from becoming airborne. Furthermore, the mixture of Sorel cement and magnesium hydroxide is not water soluble so the crust will not be washed away by rain.

Still another advantage is the hygroscopic nature of magnesium chloride. It is known that neutralizing the sodium hydroxide on the surface of the mud lake does not solve the problem of continued migration of sodium hydroxide from the wet ground below the surface to the dry surface layer. This "wicking" action has made it necessary in the past to retreat the surface to neutralize the sodium hydroxide that has migrated to the surface. Dry magnesium chloride is hygroscopic which means that it will absorb water from the air. This absorbed water forms an effective barrier to the migration of subsurface sodium hydroxide to the surface because it helps prevent the wicking action of subsurface moisture. Because sodium hydroxide does not continue to rise to the surface after treatment, it is not necessary to retreat the area during the drying cycle.

The preferred method of applying the treating chemical is in liquid form wherein the magnesium chloride is from about 20 to about 35% by weight. Especially preferred is a solution of about 30% by weight magnesium chloride. The objective is to neutralize the surface sodium hydroxide so a person skilled in the art should calculate the quantity of magnesium chloride needed in a particular application.

It has been found that at least two applications of the solution are preferable because it minimizes runoff of the treating solution and allows time for the formation of intermediate reaction products. In test applications using 31% by weight magnesium chloride solution on sections of a mud lake, an initial application of one-half gallon per square yard was effective in neutralizing the surface sodium hydroxide. A second application of one-half gallon per square yard was effective in completing the treatment and in forming a hard crust on the surface. Obviously, the actual application will change according to the particular conditions encountered, and this example is offered for illustrative purposes only.

Of course, there may be alternate methods of treating the surface of the mud lake with the compositions disclosed herein which could prove effective. For example, it is conceivable that dried magnesium chloride or calcium chloride or a mixture thereof could be applied to the surface of the mud lake in a manner similar to the way in which pesticides are applied to crops. The surface of the mud lake could be dusted from the air with the treating composition, and the same chemical reactions would occur when the powder dissolves on the surface.

Without intending to be limited by this theory, it is believed that the following chemical reaction occurs when magnesium chloride is added to the mud lake surface which contains sodium hydroxide:

$$MgCl_2 + 2NaOH \rightarrow 2NaCl + Mg(OH)_2 + heat$$

$$MgCl_2 + 6H_2O + heat \rightarrow MgO + 2HCl + 5H_2O$$

$$NaOH + HCl \rightarrow NaCl + H_2O$$

A second application of magnesium chloride further reacts with the magnesium oxide to form the Sorel cement that serves to prevent the bauxite dust from becoming airborne. Additionally, this excess magnesium chloride dries to a hygroscopic powder that absorbs moisture from the air and prevents the migration of subsurface sodium chloride to the surface. Also, it should be noted that the magnesium hydroxide is only slightly water soluble so when it combines with the Sorel cement, it effectively prevents the crust layer from being washed away by the rain.

The additional advantage from using this method is that both the calcium chloride and/or magnesium chloride reactants and the various intermediate reaction products and end products are environmentally safe and non-toxic. There is no need to further treat a mud lake following treatment in accordance with this invention. The pit can simply be refilled with a new slurry of bauxite tailings after the treated pit has sufficiently dried.

The foregoing disclosure and description of the invention are illustrative and explanatory thereof, and various changed in the details of the illustrated method of operation may be made without departing from the spirit of the invention.

What I claim is:

1. A method for treating the surface of a bauxite tailings disposal pit comprising applying a chemical composition to the surface of the pit, the composition comprising magnesium chloride or calcium chloride or mixtures thereof.

2. The method of claim 1 further comprising applying the composition to a dry or partially dry surface layer.

3. The method of claim 2 further comprising applying the composition in liquid form.

4. The method of claim 3 further comprising applying the liquid composition in at least two discrete applications.

5. The method of claim 4 further comprising allowing the composition to dry prior to applying a subsequent liquid composition.

6. The method of claim 1 further comprising applying the composition in solid form to the surface of the pit where it dissolves and reacts with the sodium hydroxide on the surface of the pit.

7. A method for treating the surface of a bauxite tailings disposal pit by applying a chemical composition to the surface of the pit, the composition comprising magnesium chloride.

8. The method of claim 7 further comprising allowing the pit to sufficiently dry so as to form a dry or partially dry top layer prior to applying the composition comprising magnesium chloride.

9. The method of claim 8 further comprising applying the composition in liquid form.

10. The method of claim 9 further comprising applying the liquid composition in at least two discrete applications.

11. The method of claim 10 further comprising allowing the composition to dry prior to applying a subsequent liquid composition comprising magnesium chloride.

12. A method for treating the surface of a bauxite tailings disposal pit by applying a chemical composition to the surface of the pit, the composition comprising calcium chloride.

13. The method of claim 12 further comprising allowing the pit to sufficiently dry so as to form a dry or partially dry top layer prior to applying the composition comprising calcium chloride.

14. The method of claim 13 further comprising applying the composition in liquid form.

15. The method of claim 14 further comprising applying the liquid composition in at least two discrete applications.

16. The method of claim 15 further comprising allowing the composition to dry prior to applying a subsequent liquid composition comprising calcium chloride.

* * * * *